United States Patent
Kimura (10) Patent No.: US 8,254,010 B2
(45) Date of Patent: Aug. 28, 2012

(54) IMAGING OF A PLURALITY OF TYPES OF IMAGES BASED ON LIGHT OF A PLURALITY OF WAVELENGTH BANDS

(75) Inventor: Takayuki Kimura, Kariya (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 12/586,205

(22) Filed: Sep. 18, 2009

(65) Prior Publication Data

US 2010/0073753 A1    Mar. 25, 2010

(30) Foreign Application Priority Data

Sep. 19, 2008   (JP) .................................. 2008-240928

(51) Int. Cl.
*G02F 1/03* (2006.01)
*G02F 1/133* (2006.01)

(52) U.S. Cl. ............ 359/246; 349/22; 349/96; 349/104; 250/201.1

(58) Field of Classification Search .................. 359/246, 359/249, 251, 252, 680, 684, 686; 349/5, 349/15, 72, 80, 96, 97, 114, 117, 175; 345/8, 345/101; 382/199; 250/201.1; 600/431; 424/9.1

See application file for complete search history.

(56) References Cited

U.S. PATENT DOCUMENTS

| | | | |
|---|---|---|---|
| 4,416,514 A | | 11/1983 | Plummer |
| 4,849,753 A | * | 7/1989 | Merry .................... 340/854.7 |
| 4,920,257 A | * | 4/1990 | Fuerthbauer et al. ...... 250/201.1 |
| 5,132,826 A | * | 7/1992 | Johnson et al. ................. 349/18 |
| 5,642,214 A | | 6/1997 | Ishii et al. |
| 6,130,731 A | * | 10/2000 | Andersson et al. ............. 349/77 |
| 6,801,263 B2 | * | 10/2004 | Sato et al. ........................ 349/15 |
| 7,405,787 B2 | * | 7/2008 | Paukshto et al. .............. 349/123 |

FOREIGN PATENT DOCUMENTS

| | | |
|---|---|---|
| JP | 57-150820 | 9/1982 |
| JP | 62-050730 | 3/1987 |
| JP | 05-027255 | 2/1993 |
| JP | 11-175702 | 7/1999 |
| JP | 2006-325135 | 11/2006 |
| JP | 2008-054170 | 3/2008 |

OTHER PUBLICATIONS

Office action dated Aug. 3, 2010 in corresponding Japanese Application No. 2008-240928.

* cited by examiner

*Primary Examiner* — Loha Ben (74) *Attorney, Agent, or Firm* — Harness, Dickey & Pierce, PLC

(57) ABSTRACT

In an optical filter, a pair of polarization filters allows transmission of light therethrough when i) the light has a wavelength band equal to or more than a first wavelength regardless of a light oscillation direction, the wavelength band including a wavelength of infrared light and ii) the light has a wavelength band less than the first wavelength and is linearly polarized. An optical rotation control element, disposed between the paired polarization filters, allows the light to be transmitted therethrough during which optical rotation of the light is changed selectively depending on application or non-application of voltage to the optical rotation control element. The polarization filters have polarization planes, respectively, which are in parallel with each other or the polarization plane of one of the polarization filters is rotated from that of the other by an angular amount of rotation resulting from the polarization of the optical rotation control element.

10 Claims, 7 Drawing Sheets

NIGHT-VISION VIEWING

FIG.6B

NORMAL VIEWING

IMAGING OF A PLURALITY OF TYPES OF IMAGES BASED ON LIGHT OF A PLURALITY OF WAVELENGTH BANDS

CROSS-REFERENCE TO RELATED APPLICATION

This application is based on and claims the benefit of priority from earlier Japanese Patent Application No. 2008-240928 filed on Sep. 19, 2008, the description of which is incorporated herein by reference.

BACKGROUND OF THE INVENTION

1. Technical Field of the Invention

The present invention relates to an imaging apparatus capable of acquiring a plurality of types of images produced based on a plurality of wavelength bands of light, and an optical filter and an image processor which can be employed by the imaging apparatus.

2. Related Art

In the technical field above, a conventional image processing apparatus, which is disclosed by Japanese Patent Laid-open Publication No. 2006-325135, for example, is known. This publication teaches a technique of processing one type of acquired images using a plurality of processing techniques, which thus produces a plurality of types of images whose optical characteristics are different from each other. The plurality of types of images are telephotographic images and wide field-of-view images, for example.

By the way, in terms of raising detection accuracy of objects, some teachings are known. For example, when detecting objects such as pedestrians and vehicles from images acquired at night, images acquired using light of a wavelength band including that of infrared light but excluding visible light of a short wavelength, which images are referred to as a first acquired image, may improve detection accuracy for the objects. Meanwhile, when detecting objects such as edges of white lines on the road (i.e., different illuminate regions in acquired images) from images acquired at night, images acquired using light of a wavelength band including visible light of a short wavelength, which images are referred to as a second acquired image, may improve detection accuracy for the objects.

However, it is impossible for the conventional imaging processing apparatus, as disclosed by the foregoing patent application, to control the optical characteristics of light producing images to be captured, because the conventional imaging apparatus performs only fixed processing on the acquired images. Hence, if the first and second acquired images are acquired, two types of imaging means for both the first and second acquired images should be prepared separately.

Meanwhile, as a technique of acquiring the first and second acquired images, there has been known another one. Practically, there is known an imaging unit provided with imaging elements serving as effective pixels, half of which pixels are made to capture pixel signals for the first acquired image and the rest half are made to capture pixel signals for the second acquired image. This way of use the pixels, half-by-half division way, allows one imaging unit (i.e., camera) to be used for acquiring both the first and second acquired images. However, due to a decrease in the number of effective pixels for each acquired image, this division way may decrease imaging sensitivity and decrease resolution in detecting edges of objects.

SUMMARY OF THE INVENTION

The present invention has been made in consideration of the foregoing difficulties, and provides an apparatus provided with one imaging means which is able to acquire a plurality of types of acquired images based on a plurality of types of wavelength bands.

In order to achieve the above object, as a first aspect of the present invention, there is provided an optical filter that allows light of particular wavelengths to be transmitted therethrough, comprising: a pair of polarization means that allows the light to be transmitted therethrough when i) the light has a wavelength band which is equal to or more than a first wavelength regardless of an oscillation direction of the light, the wavelength band including a wavelength of infrared light and ii) the light has a wavelength band which is less than the first wavelength and is linearly polarized, and optical rotation control means that is disposed between the paired polarization means and allows the light to be transmitted therethrough during which optical rotation of the light is changed selectively between presence or absence of the optical rotation depending on application or non-application of the voltage to the optical rotation control means, wherein the pair of polarization means comprises a pair of polarization filters each having a polarization plane and the polarization planes of both the polarization filters are in parallel with each other or the polarization plane of one of both the polarization filters is rotated from the polarization plane of the other polarization filter by an angular amount of rotation which is due to the polarization of the optical rotation control means.

In the present invention, "transmission (passing) of light" through the optical filter means that the light is transmitted at a transmissivity higher than a predetermined value, and does not mean that all the components of light are transmitted completely. The "predetermine value" cited in the definition of the "light transmission" may be set to an extent that configurations that make use of the light transmitted through the optical filter is able to represent their functions. For example, if the imaging means makes use of this transmitted light, the "predetermined value" is set to provide a minimum transmittance at which the imaging means is able to detect the transmitted light.

As a second aspect of the present invention, there is also provided an imaging apparatus comprising: an optical filter that allows light to be transmitted therethrough, a wavelength of the light transmitting the optical filter depending on voltage applied to the optical filer, wherein the optical filter comprises a pair of polarization means that allows the light to be transmitted therethrough when i) the light has a wavelength band which is equal to or more than a first wavelength regardless of an oscillation direction of the light, the wavelength band including a wavelength of infrared light and ii) the light has a wavelength band which is less than the first wavelength and is linearly polarized, and optical rotation control means that is disposed between the paired polarization means and allows the light to be transmitted therethrough during which optical rotation of the light is changed selectively between presence or absence of the optical rotation depending on application or non-application of the voltage to the optical rotation control means; imaging means that acquires the light that has been transmitted the optical filter; and control means that controls the application and the non-application of the voltage to the optical rotation control means.

As a third aspect of the present invention, there is provided an image processing apparatus which detects edge components from a plurality of types of images acquired in response to incidence of light waves whose wavelength bands are different from each other, the apparatus comprising: first image acquiring means for acquiring a first acquired image from an imaging apparatus which performs imaging with the incident light waves changed in the wavelength bands, the imaging performed by the imaging apparatus being based on a light wave having a wavelength band which is less than a predetermined wavelength; first image processing means for detecting the edge components from the first acquired image; second image acquiring means for acquiring a second acquired image from the imaging apparatus, the imaging performed by the imaging apparatus being based on a light wave whose wavelength excludes the wavelength band less than the predetermined wavelength; second image processing means for detecting the edge components from the second acquired image; and switchover means for commanding the imaging apparatus to perform a switchover between acquiring the first acquired image and acquiring the second acquired image, every time the first and second image acquiring means acquire the first and second acquired images respectively.

DETAILED DESCRIPTION OF THE PREFERRED EMBODIMENTS

Referring to the accompanying drawings, various embodiments of an imaging apparatus, which is according to the present embodiment, will now be described.

First Embodiment

Referring to FIGS. 1-7, a first embodiment of an object detecting apparatus, which is according to the imaging apparatus according to the present invention, will now be described. The object detecting apparatus includes an optical filter according to the present invention.

Figure 1:
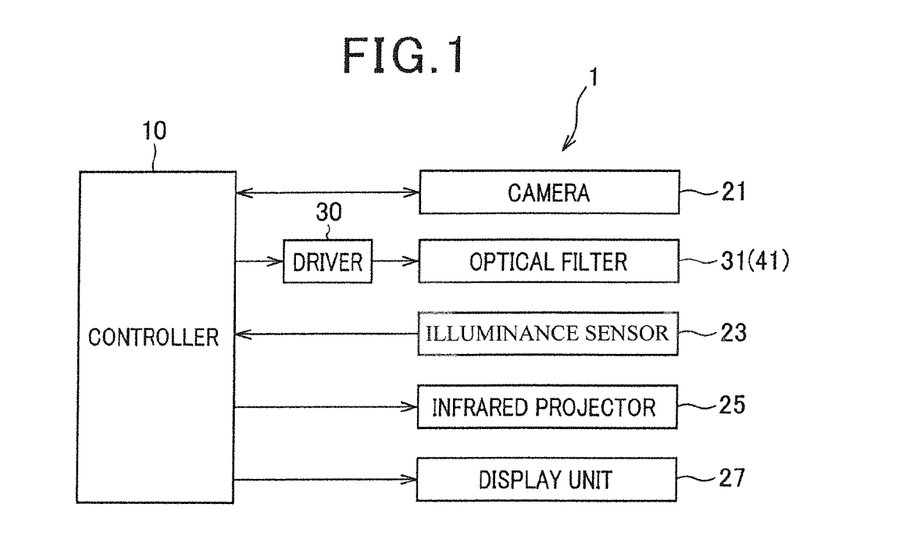
FIG. 1 is a block diagram outlining the configuration of an object detecting apparatus according to a first embodiment and a second embodiment of the present invention.

FIG. 1 shows in block form an outlined configuration of an object detecting apparatus 1 according to the first embodiment. The object detecting apparatus 1, i.e., the imaging apparatus according to the present invention, is preferably mounted in vehicles or other moving members. This object detecting apparatus 1 is provided with a controller 10, a camera 21 serving as imaging means, a driver 30, an optical filter 31, an illuminance sensor 23, an infrared projector 25 serving as radiation means, and a display device 27. Among them, the controller 10 serves as control means or an image processing apparatus.

Figure 2:
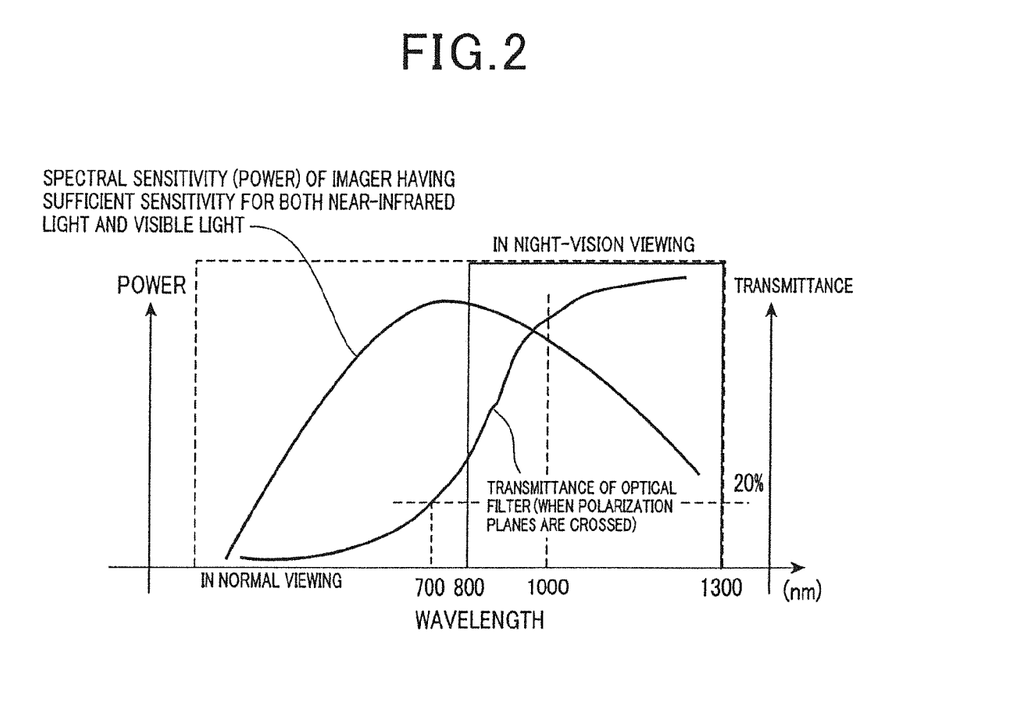
FIG. 2 is a graph showing the relationship between the wavelength of light and transmissivity of the light through the optical filter.

The camera 21 is provided on a frontal center part of a vehicle such that the camera 21 has a predetermined-size field of view directed frontward along the road on which the vehicle runs currently. This camera 21 is for example a monochrome type of camera which has sensitivity in both an infrared range and a visual range, as shown in FIG. 2. This camera 21 is able to image views and output 30 frames of view images per second, for example.

The optical filter 31 is arranged to abut on the camera 21 and to reside in the viewing range of this camera, so that light wave transmitted from the optical filter 31 enters into the camera 21. The optical filter 31 has a function of changing components (i.e., a wavelength range) of the light wave which can be transmitted through the optical filter 31, depending on a command issued from the controller 10. The command is given to the driver 30, so that the driver 30 applies and stops applying voltage to the optical filter 31 in a controlled manner.

The illuminance sensor 23, which is a known sensor, is mounted on the dashboard of the vehicle, and is able to output an electronic signal showing the illuminance (luminance, lightness, or intensity of illuminance) around the dashboard. The outputted electronic signal is sent to the controller 10 as a detection signal.

The infrared projector 25 radiates an infrared ray into the imaging range of the camera 21, so that the infrared ray captures objects which are present in the imaging range. The infrared ray is given wavelengths falling into the near-infrared domain which allows the camera 21 to work.

The display device 27, which is a known device, responds to image signals from the controller 10 by displaying images. The controller 10 is composed of a known microcomputer equipped with a CPU (central processing unit), a ROM (read-only memory), a RAM (random access memory), and other necessary components, and the CPU is able to perform various processes, such as application of voltage to the optical filter 31 and detection of objects from images acquired by the camera 21. In practice, the voltage is applied to a liquid crystal (LC) containing layer 37 of the optical filter 31, as will be explained later. The objects detected from the acquired images include pedestrians, vehicles, obstacles, white lines on the road, and traffic signs.

Figure 3:
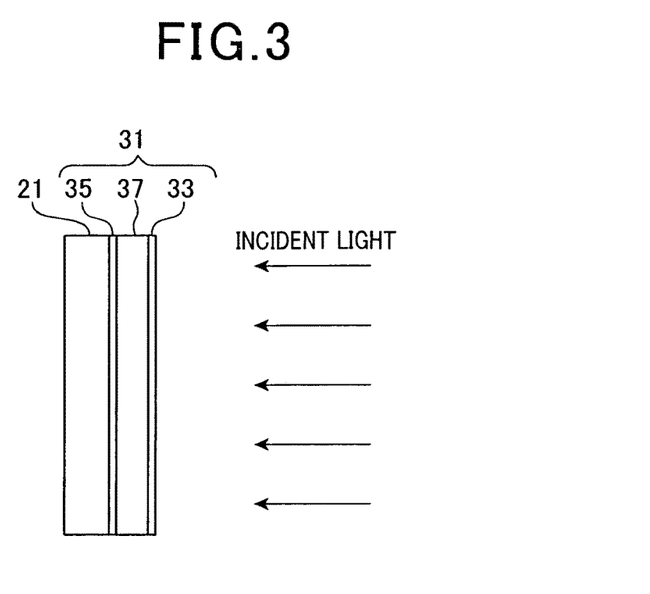
FIG. 3 is an illustration outlining the structure of a camera and an optical filter employed in the first embodiment.
Figure 4:
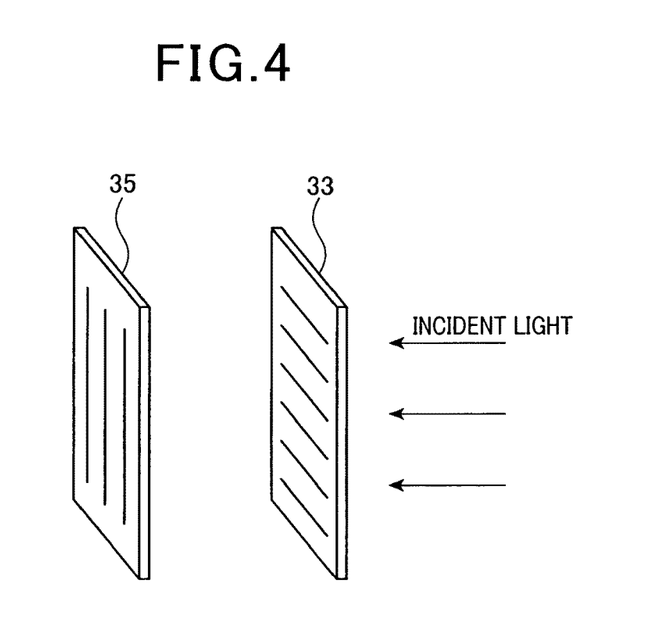
FIG. 4 is an illustration outlining the structure of polarization filters employed in the first embodiment.

The optical filter 31 will now be detained with reference to FIGS. 3 and 4, in which FIG. 3 pictorially shows a side view of both the camera 21 and the optical filter 31 and FIG. 4 shows polarization filters 33 and 35 provided in the optical filter 31. The polarization filters 33 and 35, which serve as polarizing means, provide the light wave with polarization planes when the light wave is transmitted through those polarization filters. Hence, the polarization filters 33 and 35 in FIG. 4 show straight lines which depict the directions of the polarization planes to be given to the light wave.

As pictorially shown in FIG. 3, the optical filter 31 is arranged to abut on the camera 21 and includes the incoming-side polarization filter 33, the LC containing layer 37, and the outgoing-side polarization filter 35 which are arranged in this order in the direction of incident light. The LC containing layer 37 serves as optical rotation control means. The incident light, which is directed to the camera 21, is first transmitted through the respective polarization filters 33 and 35, through which the light is subjected to filtering and polarization. In the present embodiment, light having a predetermined wavelength (a first wavelength of for example approximately 700 nm), which includes infrared light, is made to be transmitted therethrough, irrespective of the oscillation directions of the light waves, and the light is linearly polarized so that only the linearly polarized light is made to be transmitted therethrough, irrespective of the wavelengths of the incident light.

In the present embodiment, the polarization filters 33 and 35 is a polarization filter which uses, as the base material, polyvinyl alcohol. A range of light-transmission wavelengths given to the polarization filters 33 and 35 can be changed depending on dye compounded into the polarization filters 33 and 35. For example, if the wavelengths for red are desired to pass, azo-type dyes are removed.

The LC containing layer 37, which is produced by a known technique, is a layer which contains lots of LC molecules. Electrodes, which are not shown, are attached to this layer 37. Hence, when voltage is applied between the electrodes, the molecular arrangement in the layer 37 can be controlled, which is as below.

In the present embodiment, no application of the voltage to the LC containing layer 37 gives a rotation of 90 degrees to the polarization plane with the liner polarization, while application of the voltage to the LC containing layer 37 gives no rotation to the polarization plane. The polarization plane is defined as a direction permitting incident light waves to oscillate.

It is sufficient that i) both the polarization planes of the polarization filters 33 and 35 are parallel with each other or ii) the polarization plane of the outgoing-side polarization filter 35 is rotated, compared with the polarization plane of the incoming-side polarization filter 33, by an angle corresponding to the rotation angle of the polarization plane resulting from the light transmitting the LC containing layer 37, that is, 90 degrees. In the present embodiment, as shown in FIG. 4, the later geometry ii) is adopted.

Accordingly, the optical filter 31 is operative in a way that no application of the voltage to the LC containing layer 37 permits the optical filter 31 to be transmitted, therethrough, both light wave whose wavelengths are 700 nm or over and linearly polarized light wave whose wavelengths are less than 700 nm, while the application of the voltage permits the optical filter 31 to cut off the light wave whose wavelengths are less than 700 nm.

Practically, FIG. 2 shows transmissivity at which the incident light passes the optical filter 31, in which the transmissivity is less than 20% in a wavelength of 700 nm and becomes greater as the wavelength becomes longer than 700 nm. When the wavelength exceeds some 1000 nm, the transmissivity is almost constant.

The light wave transmitted through the optical filter 31 is acquired by the camera 21. In this imaging, the camera 21 represents a spectral characteristic similarly to that shown in FIG. 5, which shows a graph for the spectral characteristic obtained when the camera 21 acquires light from a xenon lamp serving as an examining light source.

Figure 5:
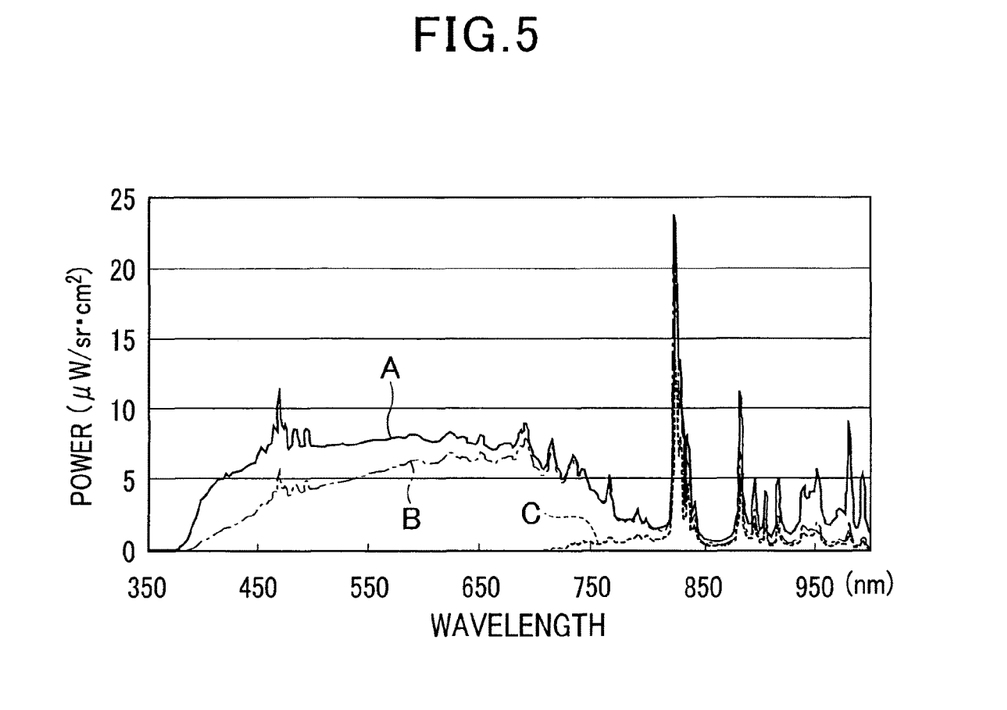
FIG. 5 is a graph showing a spectral characteristic obtained by imaging a xenon lamp with the camera.

In the spectral characteristics shown in FIG. 5, there are three waveforms A to C; the waveform A represents the spectral characteristic of an image acquired i) when the camera 21 has no optical filter, the waveform B represents the spectral characteristic of an image acquired ii) when the optical filter 31 is loaded to the camera 21 and no voltage is applied to the optical filter 31 (in detail, to the LC containing layer 37), and the waveform C represents the spectral characteristic of an image acquired iii) when the optical filter 31 is loaded to the camera 21 and voltage is applied to the optical filter 31. Hereinafter, the image acquired in the condition ii) is called "a normal image," while the image acquired in the condition iii) is called "a night-vision image."

In comparison with the waveform A with no optical filter, the waveform B obtained when the optical filter 31 is loaded and no voltage is applied has less sensitivity for light reception (i.e., output). However, the waveform B still has sufficient light-reception sensitivity through the wavelength region shown in FIG. 5. Meanwhile, in the waveform C obtained when the optical filter 31 is loaded and the voltage is applied has no sensitivity for the light reception in a range less of wavelengths less than 700 nm, but the light-reception sensitivity is almost the same as that of the waveform B in a range of wavelengths of 800 nm or more.

That is, to use the waveform C makes it possible to detect, at a higher sensitivity, light of a wavelength band (approximately 800 to 850 nm) which has a larger light quantity among the components of the light emitted from the xenon lamp, but not to detect light of a wavelength band of less than 700 nm. Hence, in detecting from the night-vision image a region of headlights of an oncoming vehicle at night, the headlights can be well distinguished from reflected light from other light sources and/or visible light components (wavelengths of less than 700 nm). On the other hand, for acquiring images in the band of wavelengths of less than 700 nm, such as detection of pedestrians or others in the daytime, the voltage to the optical filter 31 is controlled to "no application" thereof.

Figure 6A:
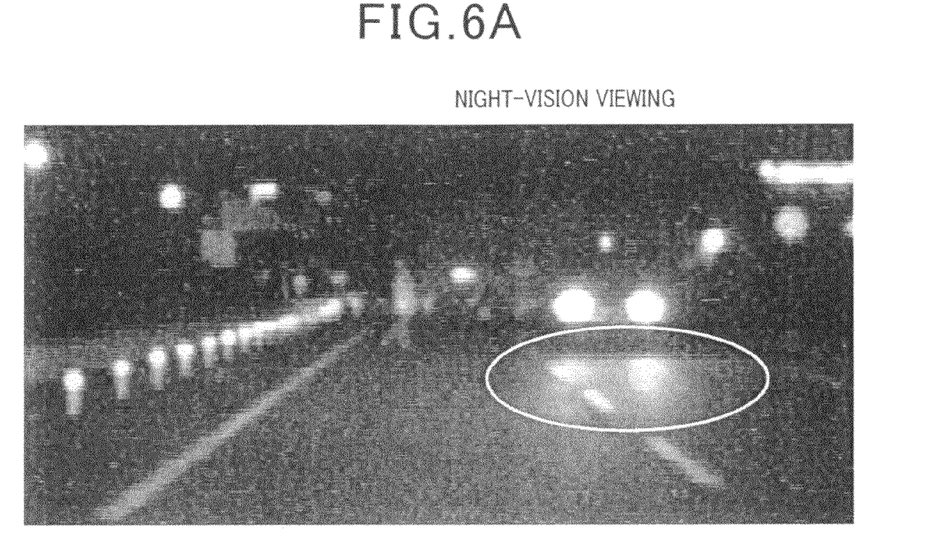
FIGS. 6A and 6B exemplify a night-vision image and a normal image.
Figure 6B:
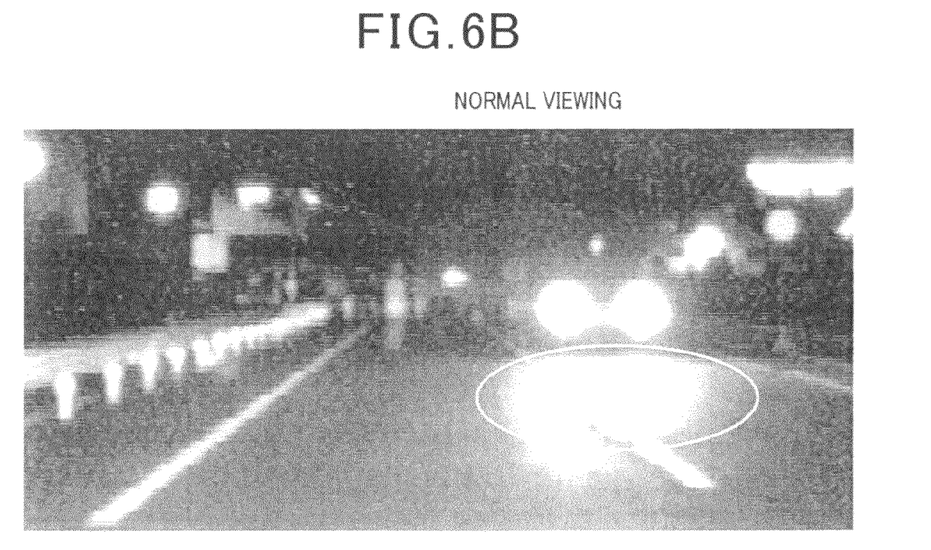

FIGS. 6A and 6B exemplify differences between a night-vision image (in FIG. 6A) and a normal image (in FIG. 6B).

Comparison between the normal image shown in FIG. 6B and the night-vision image shown in FIG. 6A shows that the while lines on the road can be detected more clearly than those in the night-vision image. However, the normal image will cause a problem that the light from the headlights of an oncoming vehicle is reflected by the road in the normal image (refer to a circled portion in FIG. 6B). This may lead to an erroneous detection of the oncoming vehicle. In contrast, the night-vision image has less road reflection of the light of the headlights of the oncoming vehicle (refer to a circled portion in FIG. 6A), so that almost no detection of the reflection is made.

Figure 7:
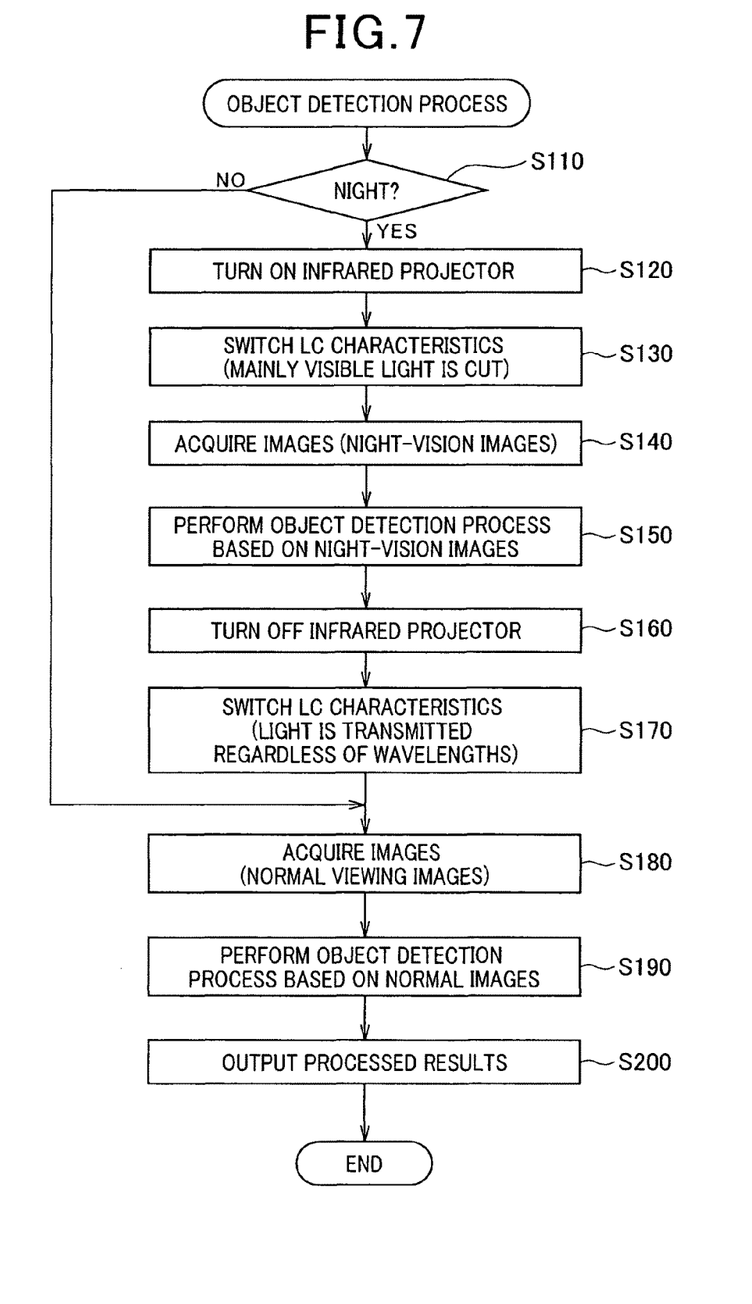
FIG. 7 is a flowchart which is carried out by a controller in the first embodiment.

In the present object detecting apparatus 1, the camera 21 acquires images to detect objects from the images, during the imaging time, the wavelength band to be image-acquired is changed. A detection process for the detection is repetitively performed at intervals by the controller 10 as shown in FIG. 7.

The detection process is started in response to turning the power supply to its ON state by operating the ignition switch (not shown) of the vehicle. When being started up, the detection process is repeated at intervals of a predetermined time (for example, 100 ms). In the present embodiment, design is made such that, at a time instant at which the detection process is started, no voltage is applied to the LC containing layer 37 of the optical filter 31.

Practically, at first, the controller 10 determines whether or not it is at night (step S110). This determination is performed based on the signal coming from the illuminance sensor 23. That is, it is determined whether or not an illuminance corresponding the detected signal shows values showing the night time. If it is determined to be not in the nighttime (No at step S110), the processing proceeds to step S180.

In contrast, when the determination shows that it is now in the nighttime (Yes at step S110), the controller commands infrared projector 25 to turn on (step S120) and commands the driver 30 to supply voltage of a predetermined value to the LC containing layer 37. This voltage application, which serves as changing means, changes the characteristics of the LC molecular orientation in the layer 37 (step S130). This processing allows the camera 21 not to detect light having a band of wavelengths less than 700 nm.

The controller 10 receives night-vision images acquired by the camera 21 after changing the LC molecular characteristics (step S140), which serves as a second acquisition means. After this, the acquired night-vision images are used for an object detection process (step S150), which serves as a second image processing means. The object detection process is given by one of known techniques and can include a step of detecting components showing the edges of objects from the acquired images and a step of pattern-matching based on the contours to of the edge components so that the objects (pedestrians, the headlights of vehicles, and others) can be decided type by type.

The controller than commands the infrared projector 25 to be turned off (step S160), and commands the driver 30 to shut down the voltage applied to the LC containing layer 37 with the result that the characteristics of the LC molecular orientation is changed (step S17), which also functions as part of the changing means. That is, this characteristic switchover allows the camera 21 to detect the light having wavelengths less than 700 nm.

After this characteristic switchover, the controller 10 accepts the images (normal images) acquired by the camera 21 (step S180), which serves as a first acquisition means). The controller 10 then uses the accepted normal images to perform the object detection process (step S190), which serves as a first image processing means. The process at step S190 is similar to that performed at step S150, for instance.

Incidentally, in the object detection process at step S180, particular objects, such as white lines on the road, of which detection precision becomes higher compared with the case of using the night-vision images, may be detected, and/or the same object(s) as those in the process at step S150 may be detected.

Finally, the detection results of the objects obtained at steps S150 and S190 are outputted to the display unit 27 (step S200), before ending the whole detection process.

Although not detailed, the detected results of the objects can be used as follows. When objects such as pedestrians are detected, the controller 10 or any other control device may be configured to issue an alarm for avoiding the objects and/or controls operations of actuators which are necessary for avoiding the objects. When the detected objects reveal the headlights of an oncoming vehicle, the controller 10 or any other control device may be adapted to change the light axis of the headlights of the vehicle, by using the object detecting apparatus 1, from the high (HI) beam to the low (LOW) beam.

In this way, the object detecting apparatus 1 of the present embodiment is provided with the optical filter 31, the camera 21, and controller 10, which operate described above. In addition, the optical filter 31 has a pair of polarization filters 33 and 35 and the LC containing layer 37 placed between the filters 33 and 35 and adapted to give the incident light wave changes in presence/absence of the optical rotation in response to application or non-application of voltage to the layer 37. In particular, the respective polarization filters 33 and 35 allow the light wave of a first wavelength (approximately 700 nm) or more (including the infrared light) to be transmitted therethrough, regardless of in which direction the light wave oscillates. At this time, the respective polarization filters 33 and 35 enables transmission, therethrough, of the linearly polarized light having wavelengths of less than the first wavelength. In addition, the polarization planes of the paired polarization filters 33 and 35 are set to be parallel with each other, or, the polarization plane of one or the paired polarization filters 33 and 35 is rotated compared to that of the other polarization filters 33 (35). The amount of rotation is set to correspond to the rotation angle of the polarization plane which is due to the LC containing layer 37.

Hence, the optical filter 31 operates such that only the light wave of which wavelength is equal to or more than the first wavelength or only the light wave of which wavelength is less than the first wavelength can be possessed through the filter 31 in a selective way, depending on application or non-application of the voltage to the LC containing layer 37.

Further, in the present object detecting apparatus 1, a plurality of images can be acquired by using the sole camera 21 in different wavelength bands.

Still further, the components of light entering the camera 21 can be switched over by the optical filer 31. Thus, it is not necessary to arrange detecting elements (pixels) having different sensitivities in a checkered pattern, but to give all the detecting elements the same sensitivity. The detecting elements having different sensitivities are, for example, elements for detecting the infrared ray (i.e., IR pixels) and elements for monochrome pixels. That is, the camera 21 can be produced with the detecting elements (pixels) having the same sensitivity. With this camera 21, all the detecting elements can be used to acquire images, thereby being effective in the use of the detecting elements.

Moreover, the object detecting apparatus 1 comprises the infrared projector 25 which radiates toward objects the light wave including light whose wavelength is the first value or more. Hence, it is thus possible to image the object in a clearer manner.

According to the optical filter 31 in the present embodiment, the LC containing layer 37 provides the optical rotation performance to only light whose wavelength is less than the second wavelength. Hence, the light wave whose wavelength is equal to or more than the first wavelength and is equal to or less than the second wavelength can be transmitted through the filter 31 without any rotation of the polarization plane.

As described, the controller 10 performs the detection process, with which the normal images (the first acquired images) and the night-vision images (the second acquired images) can be acquired from the camera 21. The normal images and the night-vision images are then subjected to the detection of edge components of objects, respectively. Every time when the acquired image is obtained, the controller 10 commands the optical filter 31 to switchover between imaging of the normal image and imaging of the night-vision images, by application and non-application of the voltage to the optical filter 31.

As a result, detecting the edge components of objects residing in the two types of acquired images having the different wavelength bands, that is, the normal image and the night-vision image, makes it possible to detect objects agreeing with the light wavelength bands for the camera 21. If image processes for the two types of acquired images are combined with each other, the detection performance can be further improved.

Second Embodiment

Figure 8:
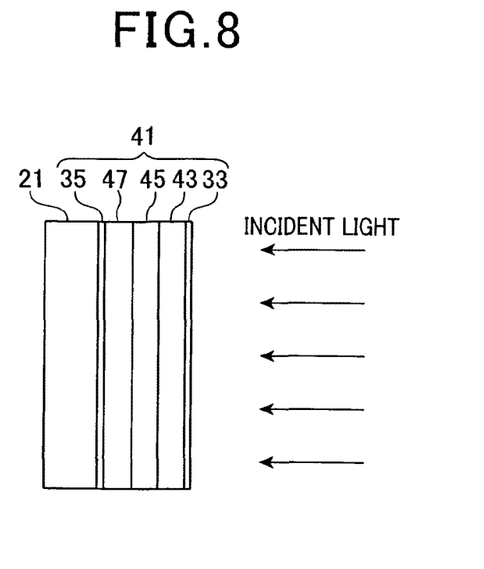
FIG. 8 is an illustration outlining the structure of a camera and an optical filter employed in the second embodiment.
Figure 9:
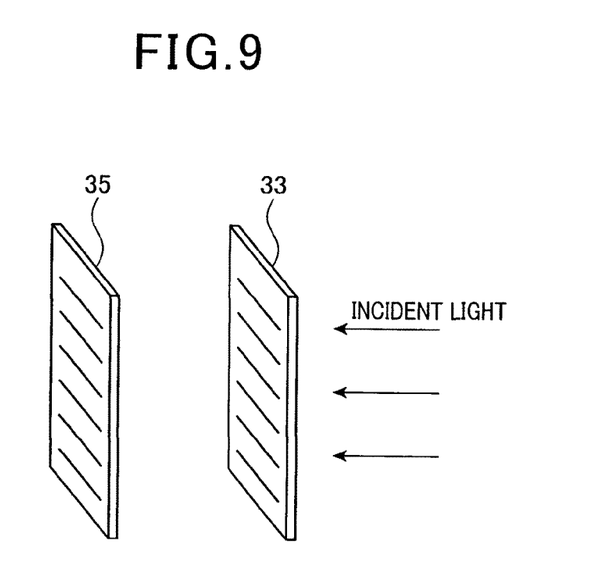
FIG. 9 is an illustration outlining the structure of polarization filters employed in the second embodiment.

Referring to FIGS. 8-9, a second embodiment of an object detecting apparatus, which is according to the imaging apparatus according to the present invention, will now be described. The object detecting apparatus includes an optical filter according to the present invention.

In the present embodiment and succeeding modifications, the similar or same components to or as those in the first embodiment will be given the same reference numerals for the sake of a simplified description.

As shown in FIG. 8, there is provided an optical filter 41 according to the present embodiment. This optical filter 41, which replaces the optical filter 31 in the configuration shown in FIG. 1, is provided with a pair of polarization filters 33 and 35 and a plurality of LC containing layers 43, 45 and 47 (three layers in the present embodiment) which are arranged between the polarization filters 33 and 35 so that all the components 35, 47, 45, 43 and 33 are stacked on one another in front of the camera 21. The LC containing layers, serving as optical rotation control means, consists of a first LC containing layer 43, a second LC containing layer 45, and a third LC containing layer 47.

As shown in FIG. 9, the pair of polarization filters 33 and 35 has polarization planes which are aligned in parallel with each other.

Figure 10:
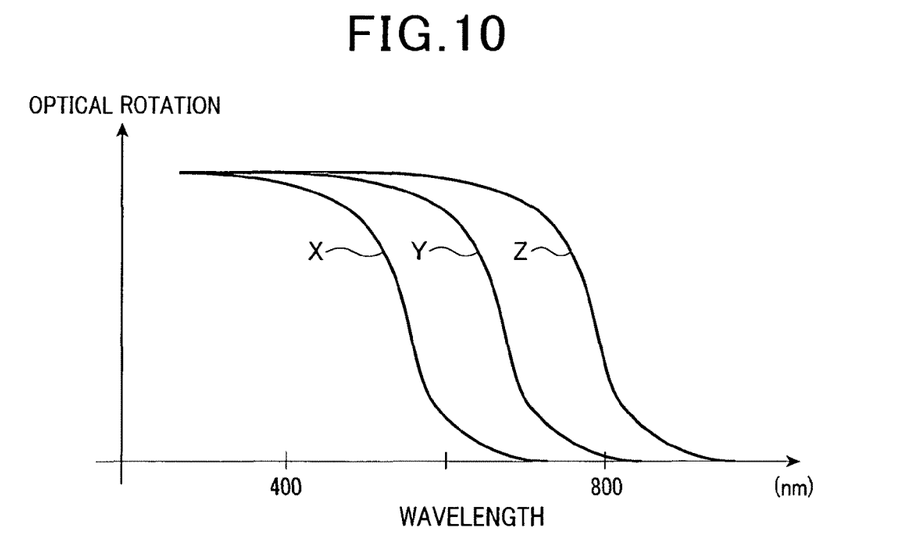
FIG. 10 is a graph showing relationships between the optical rotation and the wavelengths of LC containing layers employed in the second embodiment.

With reference to FIG. 10, the optical rotation of light which is transmitted through the respective LC containing layers 43, 45 and 47 will now be described. In FIG. 10, there are curves X, Y and Z each showing the relationship between the wavelength of light passing through the layers 43, 45 and 47 and the optical rotation. FIG. 6 shows that as the optical rotation becomes higher, the rotation angle of the polarization planes becomes larger. Each of the LC containing layers 43, 45 and 47 is set to cause the polarization plane of linearly polarized light to rotate by 90 degrees at most.

Although not shown, independent voltage application means is given to each of the LC containing layers 43, 45 and 47 so that the drive voltage can be applied to each layer independently of each other. In the state where there is no application of voltage, the wavelength bands providing the optical rotation, which are given to the layers 43, 45 and 47, are set to be different from each other. Practically, as shown in FIG. 6, the first LC containing layer 43 provides the optical rotation to light having wavelengths less than approximately 550 nm (refer to the curve X) and the second LC containing layer 45 provides the optical rotation to light having wavelengths less than approximately 670 nm (refer to the curve Y). In addition, the third LC containing layer 47 provides the optical rotation to light having wavelengths less than approximately 880 nm (refer to the curve Z).

Hence, depending on which of the LC containing layers 43, 45 and 47 is selected for the voltage application, the wavelength band of light allowed to be transmitted through this optical filter 41 can be limited in a controlled manner.

In the present embodiment, a light wave whose polarization plane is rotated by an even number of times (0, 2, 4, ...) is able to be transmitted the pair of polarization filters 33 and 35. However, a light wave whose polarization plane is rotated by an odd number of times (1, 3, ...) cannot be transmitted through the polarization filters 33 and 35. The controller 10 uses this fact to controllably apply the voltage to the respective LC containing layers 43, 45 and 47, so that only a light wave having a desired wavelength band can be transmitted through the optical filter 41.

In this way, in the object detecting apparatus according to the second embodiment, the optical filter 41 comprises the plural LC containing layers 43, 45 and 47. In addition, each of the layers 43, 45 and 47 is given a second wavelength, which is a maximum value among wavelengths that provide the optical rotation. The second wavelengths for the respective layers 43, 45 and 47 are differentiated from each other.

In this optical filter 41, in response to which of the LC containing layers 43, 45 and 47 is selected for the voltage application, the components, i.e., wavelength band, of a light wave whose polarization plane is rotated can be changed in a controlled manner.

In addition, the pair of polarization filters 33 and 35 is set such that their polarization planes are in parallel with each other. Hence, the LC containing layers 43, 45 and 47 allows a light wave, whose polarization plane has not been rotated, to be transmitted therethrough, thereby facilitating selection of the wavelengths of light to be transmitted through the optical filter 41.

A modification for setting the second wavelength is provided, in which, a maximum value among the respective second wavelengths is set to be more than the value of the first wavelength. In this case, as for the light of which wavelength is less than the first wavelength, selection of applying the voltage to which of the LC containing filters 43, 45 and 47 makes it possible to control the components (wavelengths) of the light wave allowed to pass the optical filter 41. In this case, it is preferred that, of the respective second wavelengths, values of remaining wavelengths other than the wavelength having the maximum value are set to a value less than the first wavelength.

MODIFICATIONS

Further modifications of the foregoing embodiments can also be provided, which are as follows.

Figure 11:
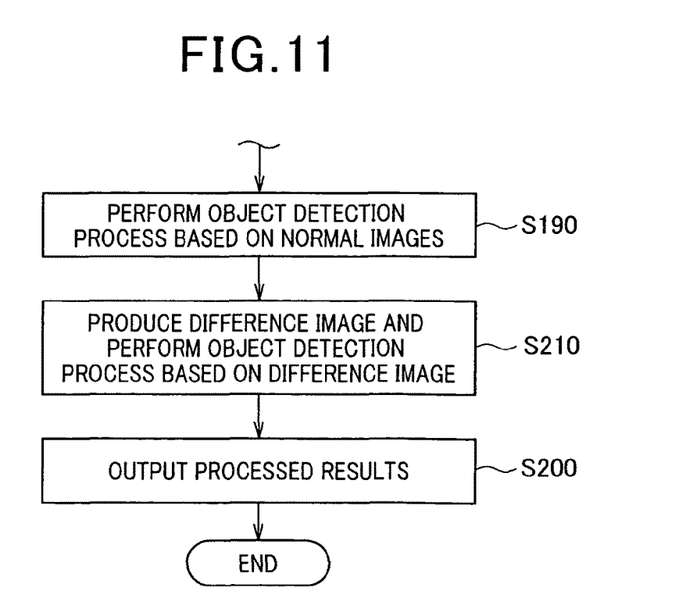
FIG. 11 is a partial flowchart showing the processing according to a modification of the embodiments.

In the foregoing embodiments, the controller 10 is configured to perform the object detection process based on each of the night-vision images and the normal images. In this regard, performing the object detection process may be modified such that a difference image is produced by subtracting a nigh-vision image from a normal image, pixel to by pixel, and this difference image is subjected to the object detection process. This processing is shown by a step S210 in FIG. 11, where the processing at steps S190 and S200 are the same as those in FIG. 7. The processing at step S210 functionally constitutes a third image processing means. Hence, according to this modification, objects can be detected from images produced by light whose wavelengths are other than wavelengths (including that for the infrared light) which is set to be no less than a predetermined wavelength.

In particular, in the example shown in FIGS. 6A and 6B, the difference image can be used to clearly detect the while lines on the road and the reflected light of the headlights of the oncoming vehicle. The processing for producing the difference image can be assigned to the controller 10 or may be the camera 21 if this camera is able to store images being captured.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An optical filter that allows light of particular wavelengths to be transmitted therethrough, comprising:
   a pair of polarization means that allows the light to be transmitted therethrough when i) the light has a wavelength band which is equal to or more than a first wavelength regardless of an oscillation direction of the light, the wavelength band including a wavelength of infrared light and ii) the light has a wavelength band which is less than the first wavelength and is linearly polarized, and
   optical rotation control means that is disposed between the paired polarization means and allows the light to be transmitted therethrough during which optical rotation of the light is changed selectively between presence and absence of the optical rotation depending, respectively, on application and non-application of the voltage to the optical rotation control means, wherein the pair of polarization means comprises a pair of polarization filters each having a polarization plane and the polarization planes of both the polarization filters are in parallel with each other or the polarization plane of one of both the polarization filters is rotated from the polarization plane of the other polarization filter by an angular amount of rotation which is due to the polarization of the optical rotation control means.

2. The optical filter of claim 1, wherein the optical rotation control means is configured to i) have the light transmitted through the optical rotation control means, the entering light having wavelengths which are less than a second wavelength different from the first wavelength and being selected in whether or not the polarization plane is rotated, depending on the application or the non-application of the voltage to the optical rotation control means, and ii) have the light including infrared light transmitted through the optical rotation control means without rotation of the polarization plane thereof, the light including the infrared light having wavelengths which are equal to or more than the second wavelength, regardless of the application or the non-application of the voltage to the optical rotation control means.

3. The optical filter of claim 2, wherein the optical rotation control means is composed of a plurality of optical rotation control means each of which being given the second wavelength different from the second wavelength given to the other optical rotation control means.

4. The optical filter of claim 3, wherein each of the optical rotation control means is composed of a liquid crystal containing layer.

5. The optical filter of claim 3, wherein the pair of polarization means has polarization planes which are in parallel with each other.

6. An imaging apparatus comprising:
an optical filter that allows light to be transmitted therethrough, a wavelength of the light which is transmitted through the optical filter depending on voltage applied to the optical filer, wherein
the optical filter comprises:
a pair of polarization means that allows the light to be transmitted therethrough when i) the light has a wavelength band which is equal to or more than a first wavelength regardless of an oscillation direction of the light, the wavelength band including a wavelength of infrared light and ii) the light has a wavelength band which is less than the first wavelength and is linearly polarized, and
optical rotation control means that is disposed between the paired polarization means and allows the light to be transmitted therethrough during which optical rotation of the light is changed selectively between presence and absence of the optical rotation depending, respectively, on application and non-application of the voltage to the optical rotation control means;
imaging means that acquires the light that has been transmitted through the optical filter; and
control means that controls the application and the non-application of the voltage to the optical rotation control means.

7. The imaging apparatus of claim 6, wherein
the pair of polarization means comprises a pair of polarization filters each having a polarization plane, and
the polarization planes of both the polarization filters are in parallel with each other or the polarization plane of one of both the polarization filters is rotated from the polarization plane of the other polarization filter by an angular amount of rotation which is due to the polarization of the optical rotation control means.

8. The imaging apparatus of claim 6, further comprising radiation means for radiating light including the light having the wavelength band which is equal to or more than the first wavelength, toward objects being imaged by the imaging means.

9. An image processing apparatus which detects edge components from a plurality of types of images acquired in response to incidence of light waves whose wavelength bands are different from each other, the apparatus comprising:
first image acquiring means for acquiring a first acquired image from an imaging apparatus which performs imaging with the incident light waves changed in the wavelength bands, the imaging performed by the imaging apparatus being based on a light wave having a wavelength band which is less than a predetermined wavelength;
first image processing means for detecting the edge components from the first acquired image;
second image acquiring means for acquiring a second acquired image from the imaging apparatus, the imaging performed by the imaging apparatus being based on a light wave whose wavelength excludes the wavelength band less than the predetermined wavelength;
second image processing means for detecting the edge components from the second acquired image; and
switchover means for commanding the imaging apparatus to perform a switchover between acquiring the first acquired image and acquiring the second acquired image, every time the first and second image acquiring means acquire the first and second acquired images respectively,
wherein the imaging apparatus comprises:
an optical filter that allows light to be transmitted therethrough, a wavelength of the light which is transmitted through the optical filter depending on voltage applied to the optical filer, wherein
the optical filter comprises
a pair of polarization means that allows the light to be transmitted therethrough when i) the light has a wavelength band which is equal to or more than a first wavelength regardless of an oscillation direction of the light, the wavelength band including a wavelength of infrared light and ii) the light has a wavelength band which is less than the first wavelength and is linearly polarized, and
optical rotation control means that is disposed between the paired polarization means and allows the light to be transmitted therethrough during which optical rotation of the light is changed selectively between presence and absence of the optical rotation depending, respectively, on application and non-application of the voltage to the optical rotation control means;
imaging means that acquires the light that has been transmitted through the optical filter; and
control means that controls the application and the non-application of the voltage to the optical rotation control means.

10. The image processing apparatus of claim 9, further comprising third image processing means for detecting the edge components from a difference image produced by subtracting the second acquired image from the first acquired image, pixel by pixel.

* * * * *

UNITED STATES PATENT AND TRADEMARK OFFICE
CERTIFICATE OF CORRECTION

PATENT NO. : 8,254,010 B2
APPLICATION NO. : 12/586205
DATED : August 28, 2012
INVENTOR(S) : Takayuki Kimura It is certified that error appears in the above-identified patent and that said Letters Patent is hereby corrected as shown below:

Col. 11, line 38, claim 6, replace "filer" with -- filter --

Col. 12, line 38, claim 9, replace "filer" with -- filter --

Signed and Sealed this
Twenty-seventh Day of November, 2012

David J. Kappos
*Director of the United States Patent and Trademark Office*